H. BILGRAM.
AUTOMATIC BRAKING DEVICE FOR COMPENSATION GEARS OF AUTOMOBILES AND OTHER SIMILAR VEHICLES.
APPLICATION FILED JULY 7, 1917.
1,251,466.
Patented Jan. 1, 1918.
2 SHEETS—SHEET 2.
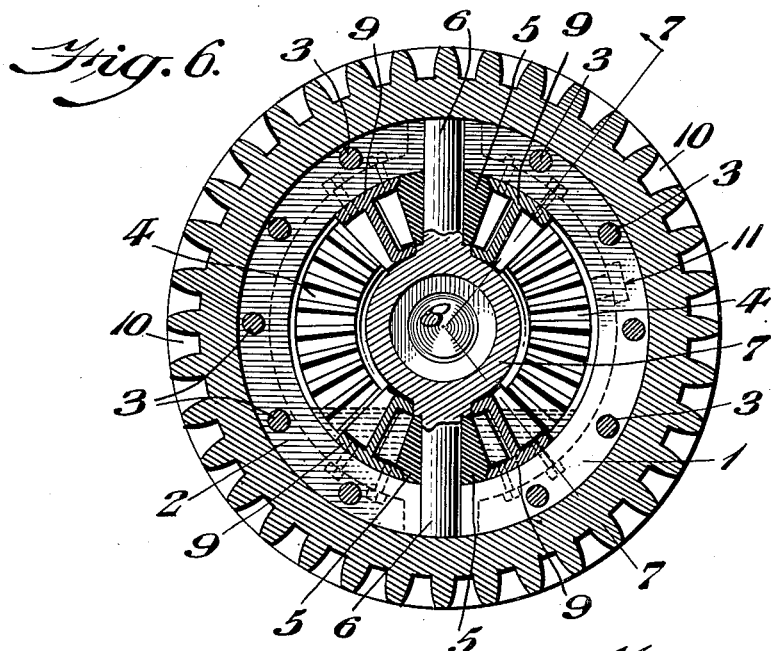
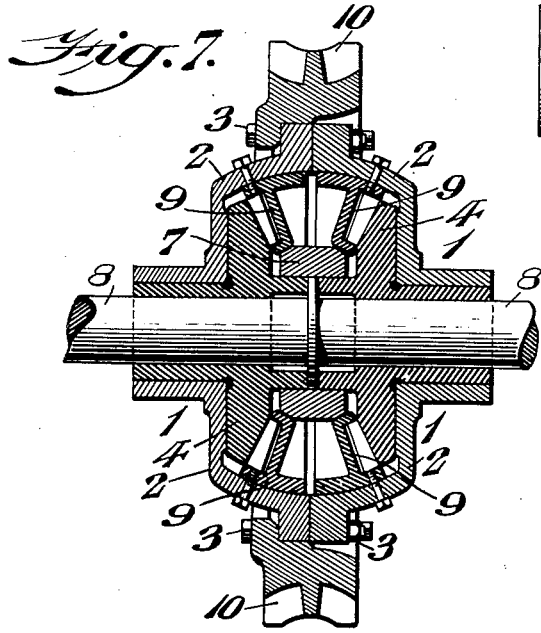
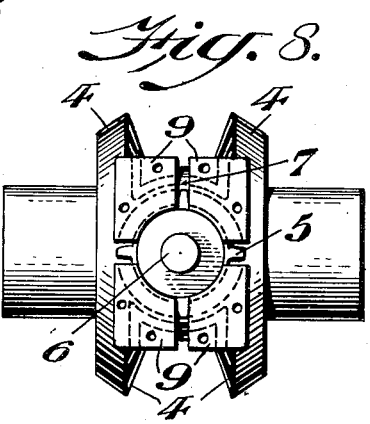
INVENTOR
Hugo Bilgram.
BY Wiedersheim + Fairbanks
ATTORNEYS

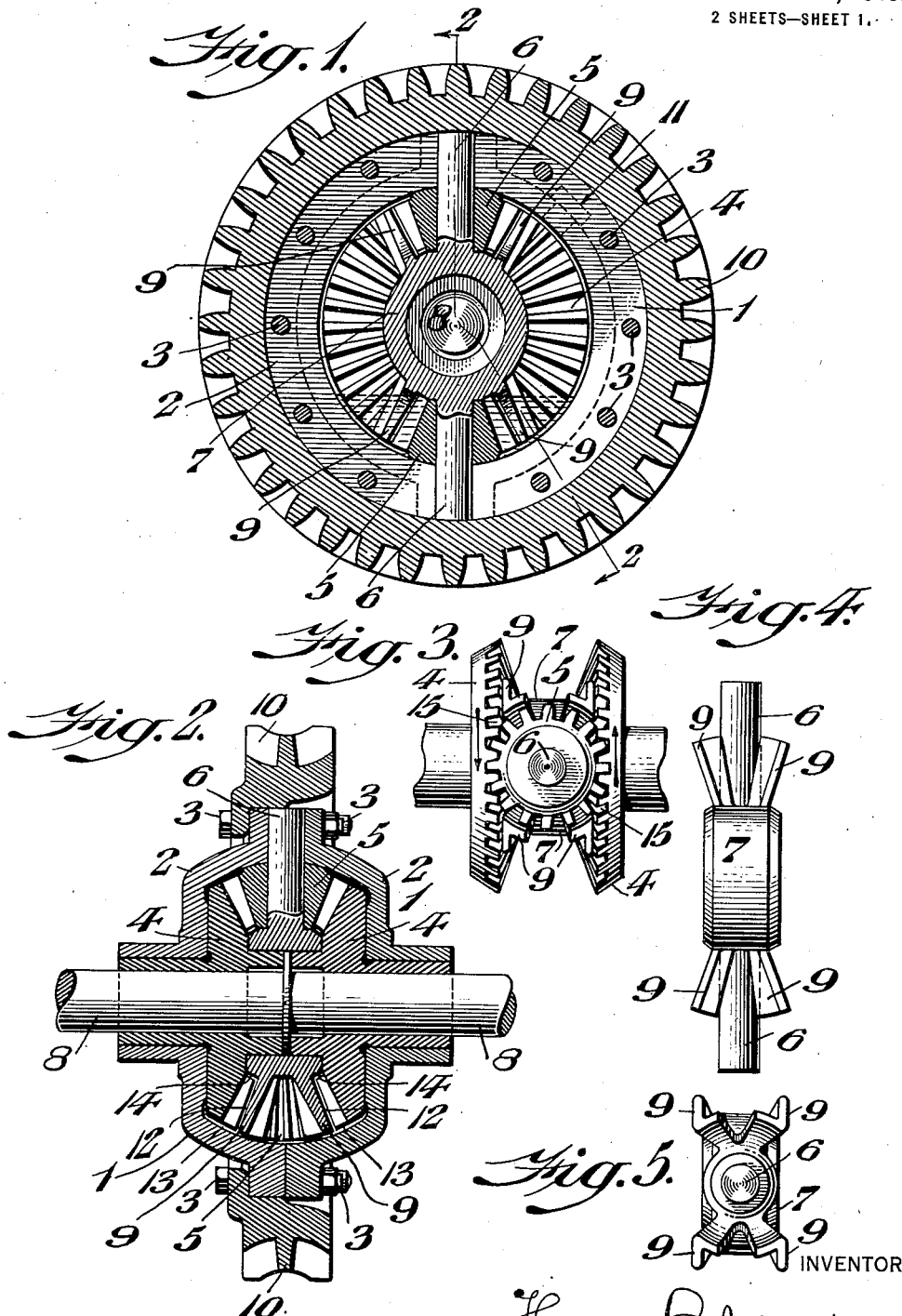

UNITED STATES PATENT OFFICE.

HUGO BILGRAM, OF PHILADELPHIA, PENNSYLVANIA.

AUTOMATIC BRAKING DEVICE FOR COMPENSATION-GEARS OF AUTOMOBILES AND OTHER SIMILAR VEHICLES.

1,251,466.  Specification of Letters Patent.  Patented Jan. 1, 1918.

Application filed July 7, 1917. Serial No. 179,126.

*To all whom it may concern:*

Be it known that I, HUGO BILGRAM, a citizen of the United States, residing in the city and county of Philadelphia, State of Pennsylvania, have invented a new and useful Automatic Braking Device for Compensation-Gears of Automobiles and other Similar Vehicles, of which the following is a specification.

My invention relates to improvements in compensating gears or differentials of automobiles and has the object of enabling power to be applied to one of the two rear wheels of the automobile if the other rear wheel happens for any reason to be free to rotate. The method by which I obtain this result is to apply an automatic braking device to the combination of compensating gears whenever they get into rapid relative operation.

It is well known that during the ordinary running the compensating gears are relatively inactive, that is, stationary in relation to each other, unless the motor runs in a curve, when the difference of the rate of rotation of the rear wheels is compensated by a slow relative motion of the compensating gears. Should for any reason one of the rear wheels become free to rotate without offering resistance, this wheel will be set into rapid rotation and the other wheel becomes unable to exert any propelling force, while the compensating gears are put into rapid relative rotation.

My plan is to supply an increasing resistance to the relative operation of the compensating gears whenever they are put in rapid relative rotation by means of tooth guards closely fitting to and enveloping the teeth of the compensating gears near the points where the teeth come into mesh. These tooth guards, while closely fitting to the outline of the teeth, should not be in actual contact with the teeth, but leave a very small space, and form pockets in the meshing angles of the teeth. When the wheels are in relative motion, some of the oil which partly fills the housing of the compensation gears, will be carried by the teeth into some of those pockets and being unable to escape freely will accumulate and in the end exert a pressure against the approaching teeth, acting as a brake against this movement.

In the accompanying drawings two modifications of my invention are illustrated, the preferred construction being shown in Figures 1, 2, 3, 4, and 5, and a second form being represented in Figs. 6, 7 and 8.

Figs. 1 and 6 are end views of an opened compensation housing, partly in section, showing the parts assembled.

Fig. 2 is a cross section of Fig. 1, on the line 2—2, thereof.

Fig. 3 shows the compensation gears and guards detached from the housing.

Fig. 4 shows an edge view of the pinion ring, pinion studs and tooth guards detached from the housing, as an integral unit.

Fig. 5 represents an end view of the same.

Fig. 7 is a section through Fig. 6, on line 7—7.

Fig. 8 shows the compensating gears detached and the tooth guards in their proper position, the latter being really held in this position by the housing, as indicated in Fig. 7.

Similar numerals of reference indicate corresponding parts in the figures. Referring to the drawings, 1 designates the compensating housing which is formed of sections 2, 2 connected by the bolts 3. In said housing are located the compensation gears 4, 4 and the pinions 5, 5 mounted as an epicyclic set. The wheels 4, 4 are pivoted in the housing, as shown in Figs. 2 and 7, while the pinions are carried by the studs 6, 6 of the pinion ring 7. The two axles 8, 8 each carrying at its far end one of the rear wheels of the automobile (not shown in the drawing), are secured each to one of the wheels 4, 4 adapted to transmit power to the said axles. The pinion ring 7 is supported by the inner hubs of the wheels 4, 4 and is free to rotate on them. The same ring also carries the tooth guards 9, 9. To the housing 1 is attached externally the driving wheel 10 which is shown in the form of a worm wheel. For the purpose of partly filling the housing with oil a hole is provided that can be closed by the screw plug 11.

The tooth spaces of the transmission gears, when near their point of mesh, are completely enveloped or sealed, the seal permitting only a knife-edge opening or leak. On the face, at 12, Fig. 2, the seal is effected by the tooth guard 9. At the large end of the tooth spaces 13 the seal is effected by the closely fitting housing 1. At their small end at 14, it is accomplished by the close fit of the pinion ring 7. In the drawing the leak spaces are shown much enlarged, as an actual scale drawing would render them invisible. The tooth guards cover the teeth only near their position of mesh, permitting the remaining teeth to be awash in the oil inclosed within the housing.

The modification shown in Figs. 6, 7 and 8 differs from the one shown in Figs. 1-5 in that the seal on all three sides of the tooth spaces is effected by the tooth guard 9 which envelops the teeth on three sides, while in the first modification the seal is completed by two different members of the mechanism. Moreover, the tooth guard is secured to the housing instead of being of one part with the pinion ring. The guards are accordingly provided with suitable flanges and with means for bolting the same to the housing 1.

Other modifications may be devised, the essential features of the invention being that the tooth spaces of the compensation gears, when near the point of mesh, are fully inclosed, barring a slight leakage, while at all other points they are in free communication with the inner space of the housing.

The device will become operative as a brake only when the compensation gears are moving in relation to each other. If they are moving relatively as indicated by darts on Fig. 3, the oil adhering to the teeth that were awash will be carried into the pockets 15, 15 formed by some of the tooth guards, and being unable to escape through the meshing teeth, will soon fill the pockets and exert a reacting pressure against the approaching teeth. The motion of the wheels will not be stopped entirely because of the slight leakage of oil from under the guards, but the reacting pressure will increase as the speed increases.

Having thus described my invention what I claim as new and desire to secure by Letters Patent is:—

1. In a device for causing a retarding force to be exerted against the rotation of a pair of gear wheels, the combination with such gear wheels of a guard composed of one or more parts inclosing the tooth spaces of said wheels in the angle of approach with tooth spaces elsewhere left unenveloped.

2. In a device for causing a retarding force to be exerted against the rotation of a pair of gear wheels, the combination with such gear wheels of a guard composed of one or more parts inclosing the tooth spaces of said wheels in the angle of approach with tooth spaces elsewhere left unenveloped, and an inclosure adapted to be filled partly with oil, grease, or other fluid or semi fluid.

3. In a compensating gear of an automobile or other vehicle, the combination of compensating gear wheels, a housing therefor adapted to carry oil or other fluid, or semi fluid, and guards inclosing the tooth spaces of said gear wheels in the angles of mesh but leaving the tooth spaces elsewhere uninclosed.

HUGO BILGRAM.

Witnesses:
JOHN WIEDERSHEIM,
N. BUSSINGER.